United States Patent [19]

Johnson

[11] Patent Number: 4,944,091

[45] Date of Patent: Jul. 31, 1990

[54] NUT SPLITTING DEVICE

[76] Inventor: Paul E. Johnson, 1115 Main St., Springfield, Oreg. 97477

[21] Appl. No.: 380,803

[22] Filed: Jul. 17, 1989

[51] Int. Cl.[5] ............................................. B26B 17/00
[52] U.S. Cl. ..................................... 30/120.2; 30/282
[58] Field of Search ................. 30/120.1, 120.2, 120.3, 30/120.4, 120.5, 282, 278, 272.1

[56] References Cited

U.S. PATENT DOCUMENTS 964,414 7/1910 Fort et al. ........................... 30/120.2

FOREIGN PATENT DOCUMENTS 232827 5/1959 Australia ............................ 30/120.3

Primary Examiner—Douglas D. Watts
Attorney, Agent, or Firm—James D. Givnan, Jr.

[57] ABSTRACT

A manually operated nutcracking device with a threaded member for urging carrier and a wedge thereon into nut engagement to split the nut. A base includes a pair of guides and a nut supporting member. The carrier includes plate components coupled to the wedge in a detachable manner. The plate components are recessed to engage the inner edges of the pair of guides. A foot on the threaded member imparts travel to the carrier.

3 Claims, 1 Drawing Sheet

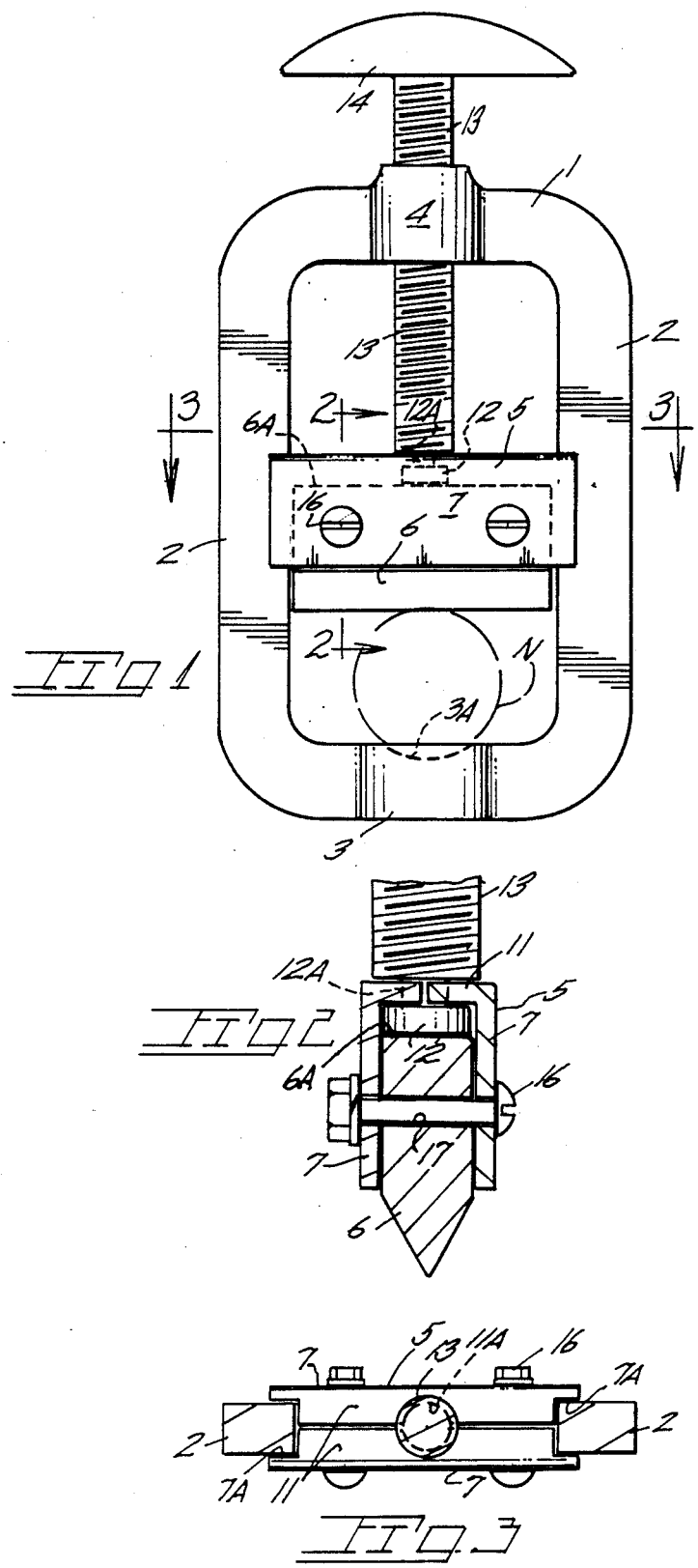

NUT SPLITTING DEVICE

BACKGROUND OF THE INVENTION

The present invention pertains generally to devices for opening nutshells.

In the prior art are a wide variety of devices, commonly referred to as nutcrackers. Typically such cracking devices include a lever for imparting loads to the nutshell. Often not only is the shell fractured but the nut meat is broken into small pieces. Certain nuts, as for example the macadamia nut, are difficult to crack without crushing or breaking the nut kernel.

SUMMARY OF THE PRESENT INVENTION

The present invention is embodied in a device for splitting nutshells utilizing a wedge and a threaded feed member.

A base of the present device serves to retain the nut in place during advancement of the wedge into shell engagement. Wedge travel is controlled to the extent that fracturing of the shell may be accomplished without damaging the kernel of the nut. Such control of the wedge member is by use of a threaded shaft having an end confined within a carrier for the wedge. The carrier is slidably mounted on a pair of guides integral with the base. The wedge or splitting member is preferably removably mounted for substitution purposes.

Important features of the present splitting device is the provision of a device for fracturing and removing the shells of nuts; the provision of a splitting device for nuts wherein a wedge member is slidably carried on the base of the device and subject the incremental positioning to prevent crushing of the nut meat after fracturing of the shell.

BRIEF DESCRIPTION OF THE DRAWINGS

In the accompanying drawings:

FIG. 1 is a front elevational view of the present splitting device; and

FIG. 2 is a vertical sectional view taken along line 2—2 of FIG. 1.

DETAILED DESCRIPTION OF THE PREFERRED EMBODIMENTS

With continuing attention to the drawings wherein applied reference numerals indicate parts hereinafter similarly identified, the reference numeral 1 indicates a base of the present device.

The base includes a frame structure having parallel guides 2, a nut support 3 and an internally threaded boss at 4. Nut support 3 is recessed at 3A to hold the nut at N in place for cracking.

The guides 2 on the base serve to receive a carrier 5 for a wedge 6 for splitting the shell. Said carrier may be of formed metal plate components 7 each with shoulders at 7A for sliding entrainment on the inner edges of guides 2. The plate components 7 are of right angular shape each having an uppermost flange 11 recessed at 11A.

A threaded shaft 13 in boss 4 is provided with a fingerwheel 14 for imparting rectilinear travel to wedge 6 held in carrier 5 by fasteners 16. A foot 12 on a stem 12A carried by the lower end of shaft 13 bears upon the top edge 6A of wedge 6. The wedge is retracted along the base guides 2 by connector foot 12 engaging the underside of the carrier flanges 11. The fastener assemblies 16 extend through the carrier plate components and through a pair of bores 17 in wedge 6. Fastener assembly removal permits wedge substitution if so desired.

The present device is particularly suited for cracking macadamia nuts which have thick and extremely hard shells rendering same difficult to crack with lever type nutcrackers.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

1. A device for splitting nutshells comprising,
   a base including a nutshell support and parallel guides,
   a carrier on said guides and including a wedge, said carrier including flanges upwardly spaced from said wedge, and
   adjustable means in threaded engagement with said base and with said carrier for imparting rectilinear travel thereto to urge the splitting member into and out of contact with a nut on said support, said adjustable means including a foot confined between said flanges and the wedge.

2. The device claimed in claim 1 wherein said flanges are recessed for entrainment on said guides.

3. The device claimed in claim 2 additionally including fastener assemblies removably attaching the wedge to on said carrier.

* * * * *